United States Patent
Wilkins

(10) Patent No.: US 9,063,366 B2
(45) Date of Patent: Jun. 23, 2015

(54) DISPLAY DEVICE USING MICROPILLARS AND METHOD THEREFOR

(71) Applicant: The Boeing Company, Chicago, IL (US)

(72) Inventor: Donald F. Wilkins, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 13/804,347

(22) Filed: Mar. 14, 2013

(65) Prior Publication Data

US 2014/0267977 A1    Sep. 18, 2014

(51) Int. Cl.
| G02F 1/1335 | (2006.01) |
| G01D 11/28 | (2006.01) |
| G02B 26/02 | (2006.01) |
| F21V 8/00 | (2006.01) |
| G02B 27/00 | (2006.01) |

(52) U.S. Cl.
CPC .............. *G02F 1/1335* (2013.01); *G02B 26/02* (2013.01); *G02B 6/0008* (2013.01); *G02B 6/0078* (2013.01); *G02B 27/0018* (2013.01)

(58) Field of Classification Search
CPC ..................... G02F 1/133615; G02F 1/133603; G02F 1/133604; G02F 1/133528; G02F 1/133536; G02F 1/133514; G02F 1/133512; G02F 1/133516; G02B 5/3033; G03H 1/0406; G03H 1/00; G03H 1/23; G03H 1/268; G03H 2001/2685; G01B 9/021

USPC .............. 349/61, 96, 106; 362/31, 23
See application file for complete search history.

(56) References Cited

U.S. PATENT DOCUMENTS

| 4,651,343 | A | 3/1987 | Laor | |
| 6,585,442 | B2 | 7/2003 | Brei et al. | |
| 7,884,530 | B2 | 2/2011 | Aizenberg et al. | |
| 2002/0186956 | A1* | 12/2002 | Lowry | 385/147 |
| 2004/0122328 | A1 | 6/2004 | Wang et al. | |
| 2007/0279367 | A1* | 12/2007 | Kitai | 345/102 |
| 2010/0053727 | A1* | 3/2010 | Lee et al. | 359/295 |
| 2012/0168233 | A1 | 7/2012 | Clark | |
| 2012/0314445 | A1 | 12/2012 | Masuda | |
| 2013/0172671 | A1 | 7/2013 | Rentschler et al. | |
| 2014/0246321 | A1* | 9/2014 | Tsukada et al. | 204/601 |

FOREIGN PATENT DOCUMENTS

| EP | 2177558 A1 * | 4/2010 | ................ C08J 7/12 |
| WO | 2014078507 A1 | 5/2014 | |

OTHER PUBLICATIONS

Höfling, S. et al.; Semiconductor Quantum Light Emitters and Sensors; Quantum Sensing and Nanophotonic Devices VII; Proc. of SPIE vol. 7608; pp. 760804-1-760804-9; © 2010 SPIE.

(Continued)

*Primary Examiner* — Mike Qi
(74) *Attorney, Agent, or Firm* — Armstrong Teasdale LLP

(57) ABSTRACT

In one aspect, a display device includes a light source for supplying light energy and a light modulation layer including a plurality of micropillars that each have a fixed end and a free end. An activation layer is configured to activate the micropillars to modulate light energy from the light source passing through the micropillars.

20 Claims, 4 Drawing Sheets

(56) References Cited

OTHER PUBLICATIONS

Ghanbari, A. et al.; A Micropillar-based On-chip System for Continuous Force Measurement of *C. elegans*; Journal of Micromechanics and Microengineering; Published Jul. 26, 2012; pp. 1-10; © 2012 IOP Publishing Ltd.

Chan, Yu Fei et al., Electroluminescence from ZnO-Nanofilm/Simicropillar Heterostructure Arrays, Optics Express, vol. 20, No. 22, pp. 24280-24287, 2012.

Microfluids; http://www.imec.bc/ScientificReport/SR2010/2010/1159254.html; 6 pages; 2010; retrieved from internet Jan. 14, 2013.

Hiraoka, M. et al; Integrated Fluidic System for Bio-Molecule Separation; 32nd Annual International Conference of IEEE EMBS; pp. 6514-6517; Buenos Aires, Argentina; Aug. 31-Sep. 4, 2010.

Cheng, D. et al.; A Sensing Device Using Liquid Crystal in a Micropillar Array Supporting Structure; Journal of Microelectromechanical Systems; vol. 18, No. 5; pp. 973-982; Oct. 2009.

EPO Extended Search Report for related application No. 14155649.8-1553 dated Aug. 26, 2014, 7 pp.

EP Extended Search Report for related matter 14-1554683.3-1356 dated Sep. 19, 2014, 10 pp.

Liou, Dar-Sun et al., Axial Particle Displacements in Fluid Slugs After Passing a Simple Serpentiform Microchannel, Nicrofluid Nanofluid, 2009,7:145-148.

Xu, J., et al., Microphone Based on Polyvinylidene Fluoride (PVDF) Micro-Pillars and Patterned Electrodes, Sensors and Actuators, 2009, A153:24-32.

Gallego-Perez, Daniel et al., Versatile Methods for the Fabrication of Polyvinylidene Fluoride Microstructures; Biomed Microdevices, 2010, 12:1009-1017.

Moon, Myoung-Woon et al., Tilted Janus Polymer Pillars; Soft Matter, 2010, vol. 6, pp. 3924-3929.

Menguc, Yigit et al., Gecko-Inspired Controllable Adhesive Structures Applied to Micromanipulation, Adv. Funct. Mater., 22:1246-1254. doi: 10:1002/adfm.201101783, Jan. 19, 2012.

Menguc, Yigit et al., Staying Sticky: Contact Self-Cleaning of Gecko-Inspired Fibrillar Adhesives, 2012, available at http://people.seas.harvard.edu/~ymenguc/research.html; last visited Feb. 25, 2013.

Rivas, Juan (2004). Radio Frequency dc-dc Power Conversion, (Doctorate thesis). Department of Electrical Engineering and Computer Science, Massachusetts Institute of Technology, Sep. 2006.

European Search Report issued in European Application No. 14156154.8 on Aug. 18, 2014, 9 pages.

Bright, V.M., et al., "Prototype Microrobots for Micro Positioning in a Manufacturing Process and Micro Unmanned Vehicles," Micro Electro Mechanical Systems, 1999. MEMS '99. Twelfth IEEE International Conference, Jan. 17-21, 1999, pp. 570-575.

Byungkyu, Kim et al., "A Ciliary Based 8-Legged Walking Micro Robot Using Cast IPMC Actuators," Proceedings / 2003 IEEE International Conference on Robotics and Automation, Sep. 14-19, 2003, pp. 2940-2945.

Liwei, Shi et al., "A Novel Soft Biometic Microrobot with Two Motion Attitudes," Sensors, vol. 12, No. 12, Dec. 6, 2012, pp. 16732-16758.

\* cited by examiner

DISPLAY DEVICE USING MICROPILLARS AND METHOD THEREFOR

FIELD

The field of the disclosure relates generally to display devices. More particularly, the field of the disclosure relates to display devices using micropillars for light modulation.

BACKGROUND

Electronic displays are used with many devices, such as mobile phones, personal computers, televisions and the like. Such displays are used to display information to a user, or other person viewing the display. One type of display technology is known as a liquid crystal display (LCD), and has become increasingly popular due to its relatively thin size, light weight, low power consumption and low electromagnetic radiation compared to prior cathode ray tube displays.

Typically, LCD displays are formed as an assembly including a liquid crystal layer disposed between a thin film transistor (TFT) substrate and a filter layer. When an electric field is applied between a pixel electrode on the TFT substrate and a counter electrode on the filter, an orientation of affected liquid crystal molecules are modified to alter the transmittance of light through the display. By altering the transmittance of the light, the image on the display can be controlled. However, LCD devices require polarized plates to be used, such that unpolarized light is converted to polarized light before being output by the LCD display. The conversion of polarized light to unpolarized light may reduce the efficiency (i.e., the brightness) of the display to 50 percent or less of the brightness of the unpolarized light. As such, additional power consumption is necessary to increase the brightness of such displays, which may reduce the operational life of portable, or battery powered, displays.

Further, LCD displays may be affected by "ghosting" or after-image." Ghosting refers to when a previous image is undesirably retained on the screen of an LCD display when the screen is switched from one image to the next image, due to a slow switching speed of the liquid crystal material in the display.

Although attempts have been made to increase efficiency and reduce ghosting in LCD displays, a need exists for a display that is energy efficient and substantially eliminates the possibility of ghosting.

BRIEF DESCRIPTION

In one aspect, a display device includes a light source for supplying light energy and a light modulation layer including a plurality of micropillars that each have a fixed end and a free end. An activation layer is configured to activate the micropillars to modulate light energy from the light source passing through the micropillars.

In another aspect, an electronic display system includes a light source for supplying light energy and a light modulation layer that includes a plurality of micropillars each having a fixed end and a free end. Each micropillar corresponds to a pixel of an array of pixels. An activation layer is configured to activate the micropillars to modulate light energy from the light source passing through the micropillars. A controller is in communication with the activation layer. The controller is configured to selectively activate each of the micropillars individually.

In yet another aspect, a method of modulating a light source includes transmitting light from a light source to a light modulation layer including a plurality of micropillars each having a fixed end and a free end. The emitted light is received at the fixed ends of the micropillars and emitted from the free ends of the micropillars. At least one of the micropillars is activated to cause a free end of the activated micropillar to be out of alignment with the fixed end of the activated micropillar to modulate the light emitted from the activated micropillar.

DETAILED DESCRIPTION

Figure 1:
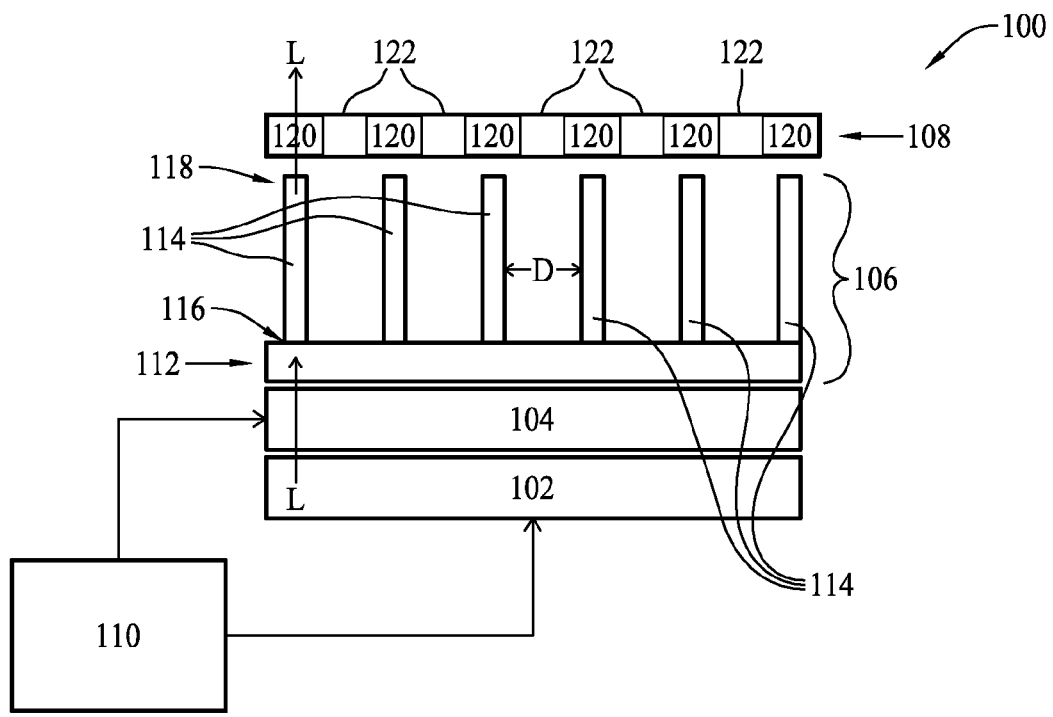
FIG. 1 is a schematic illustration of an implementation of a display system.

Referring now to the drawings, and in particular FIG. 1, an electronic display system is shown generally at 100. In the exemplary implementation, the display system 100 includes a light source 102, an activation layer 104, a light modulation layer 106 and a filter layer 108. In some implementations, a controller 110 is in communication with one or more of the light source 102 and the activation layer 104.

The light source 102 is a source that emits electromagnetic radiation in one or more wavelengths. For example, light source 102 may include one or more of a light emitting diode (LED), organic LED, incandescent bulb, fluorescent bulb, neon bulb, ambient light, the sun or any other electronic or chemical device capable of emitting electromagnetic radiation. In some implementations, the light source emits white light, a single color (wavelength of light) of light, a combination of two or more colors of light, ultraviolet light, infrared light or the like. The light source may also emit any combinations of such light. The light source may emit light directionally or omnidirectionally. In the exemplary implementation, when light source 102 emits light L towards filter layer 108, activation layer 104 is located downstream of light source 102, light modulation layer 106 is located downstream of activation layer 104, and filter layer 108 is located downstream of light modulation layer 106.

The light modulation layer 106 includes a base portion 112 and a plurality of micropillars 114. Each of the micropillars includes a fixed end 116 and a free end 118. The fixed ends 116 are coupled to, or formed integrally with, the base portion 112. The micropillars 114 are substantially transparent, such that light emitted from light source 102 enters the fixed ends 116 and exits the free ends 118 without the intensity of the light being substantially reduced. In one implementation, the micropillars 114 are fabricated of a piezo-electric material, such as lead zirconate titanate (PZT). However, other suitable materials may be used that allow the light modulation layer to function as described herein such as, but not limited to, a shape memory alloy. The light modulation layer 106 may include a plurality of micropillars 114 arranged in an array, such as a rectangular grid pattern having perpendicular rows and columns. In such embodiments, the plurality of micropillars 114 may each be spaced apart by a distance D. The spacing between adjacent ones of the micropillars 114 may be the same between all of the micropillars 114, or may vary depending upon the desired application.

The activation layer 104 is configured to selectively activate individual ones of the micropillars 114, for example by transmitting an electrical energy thereto. For example, the application of electrical energy to piezoelectric material or the application and/or removal of heat to a shape memory alloy material can bend micropillars 114. In one implementation, the activation layer is a thin film transistor (TFT) layer, including a plurality of transistors corresponding to respective ones of the micropillars 114. One of ordinary skill will appreciate that TFT layers are commonly used in other electronic displays, such as LCD type displays. The details of such activation layers are not further discussed herein.

Figure 3:
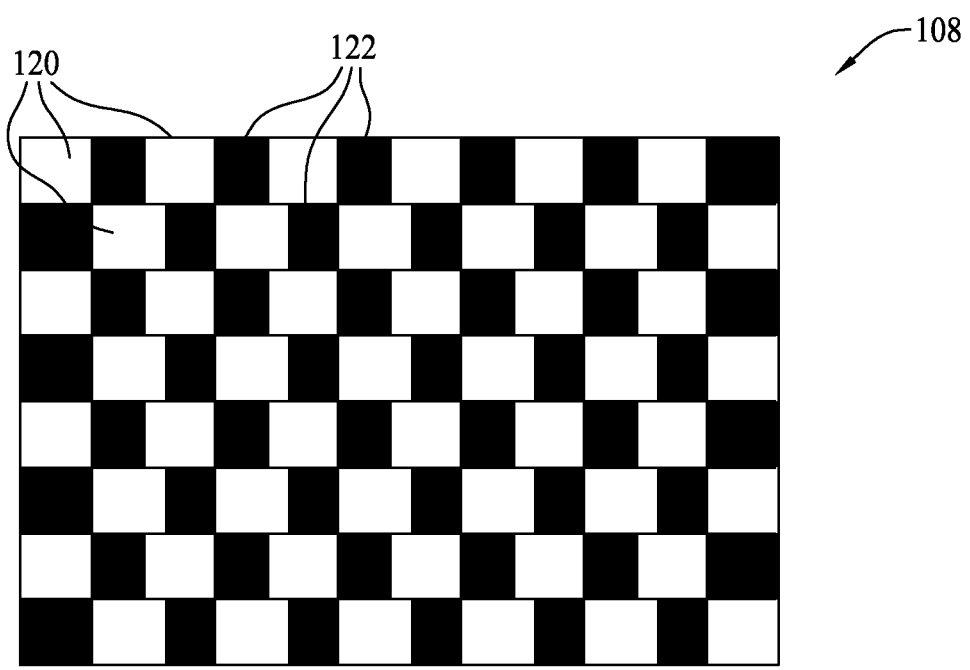
FIG. 3 is a plan view of an implementation of a filter layer.

In the implementation illustrated in FIG. 1, the display system 100 also includes a filter layer 108. The filter layer 108 includes a plurality of semi-transparent areas 120 and a plurality of substantially opaque areas 122. As best shown in FIG. 3, the semi-transparent areas 120 and substantially opaque areas 122 may be arranged in an array, or grid, as illustrated. One or more of the semi-transparent areas 120 and substantially opaque areas 122 may be used as a pixel of a display. In some embodiments, each of the semi-transparent areas 120 and substantially opaque areas 122 has an individual one of the micropillars 114 associated therewith. However, in some implementations, a single micropillar 114, or pixel, may be associated with two or more of the semi-transparent areas 120 and substantially opaque areas 122. In some embodiments, the filter layer 108 may be covered with a protective film or other layer (not shown).

Figure 2:
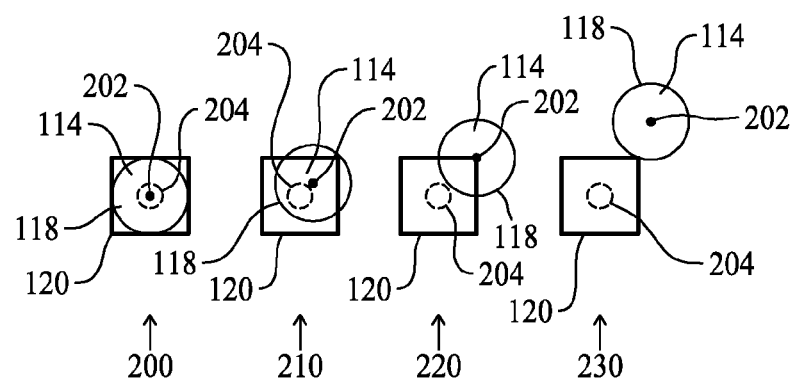
FIG. 2 is a plan view of a micropillar in various degrees of activation.

Referring now to FIG. 2, plan views of a micropillar 114 are illustrated in four different states of activation. In the first state 200, the micropillar 114 is in a neutral, or deactivated, state. As such, in the first state 200, the activation layer 104 has not transmitted sufficient activating energy to the micropillar 114 to fully or partially activate the micropillar 114. In this state, the free end 118 of micropillar 114 is substantially aligned with the semi-transparent area 120. For example, the axial center 202 of the free end 118 of the micropillar 114 is aligned with the center 204 of the semi-transparent area 120. In the neutral state 200, substantially all of the light entering the fixed end 116 of the micropillar 114 is transmitted through the micropillar 114 and exits the free end 118 and then is transmitted through the semi-transparent area 120, thus creating a "bright spot," "bright pixel" or area of intense light.

In partially activated state 210, the activation layer 104 has transmitted a sufficient amount of activation energy to the micropillar 114 to cause partial activation of the micropillar 114. As such, in partially activated state 210, the free end 118 has bent, or flexed, such that the axial center 202 of the free end 118 is not aligned with the center 204 of the semi-transparent area 120. As such, only a portion of the light exiting the free end 118 of the micropillar 114 is transmitted through the semi-transparent area 120 (i.e., light from the portion of the free end 118 within the sides of the semi-transparent area 120). Light transmitted from the free end 118 outside of the semi-transparent area is not transmitted through the semi-transparent area 120, thus modulating (i.e., reducing) the intensity of the light emitted from the semi-transparent area 120. Similarly, at partially activated state 220, the activation layer 104 has transmitted a sufficient amount of activation energy to the micropillar 114 to cause further activation of the micropillar 114 as compared to state 210. Accordingly, a smaller amount of light is transmitted from the free end 118 through the semi-transparent area 120, further reducing the intensity of the light. In these states 210, 220, a "dim spot," "dim pixel" or area of reduced light intensity (as compared to the bright pixels) is created.

Fully activated state is represented generally at 230. In the fully activated state, the activation layer 104 has transmitted sufficient energy to bend the free end 118 fully outside of (e.g., fully out of alignment with) the semi-transparent area 120. As such, none of the light exiting the free end 118 of the micropillar 114 in the fully activated state is transmitted through the semi-transparent area 120. Thus, the fully activated state 230 creates a "dark spot," "black pixel" or an area lacking light transmission from a micropillar 114.

In some embodiments, the micropillar 114 is configured such that when activated by activation layer 104, the free end 118 of the activated micropillar 114 will partially or fully align with a substantially opaque area 122 (FIG. 3). As such, the light exiting the free end 118 is blocked by the substantially opaque area. In other embodiments, in the neutral state, the free ends 118 of the micropillars 114 may be aligned with the substantially opaque areas 122, and become partially or fully aligned with the semi-transparent areas 120 upon activation.

Figure 4:
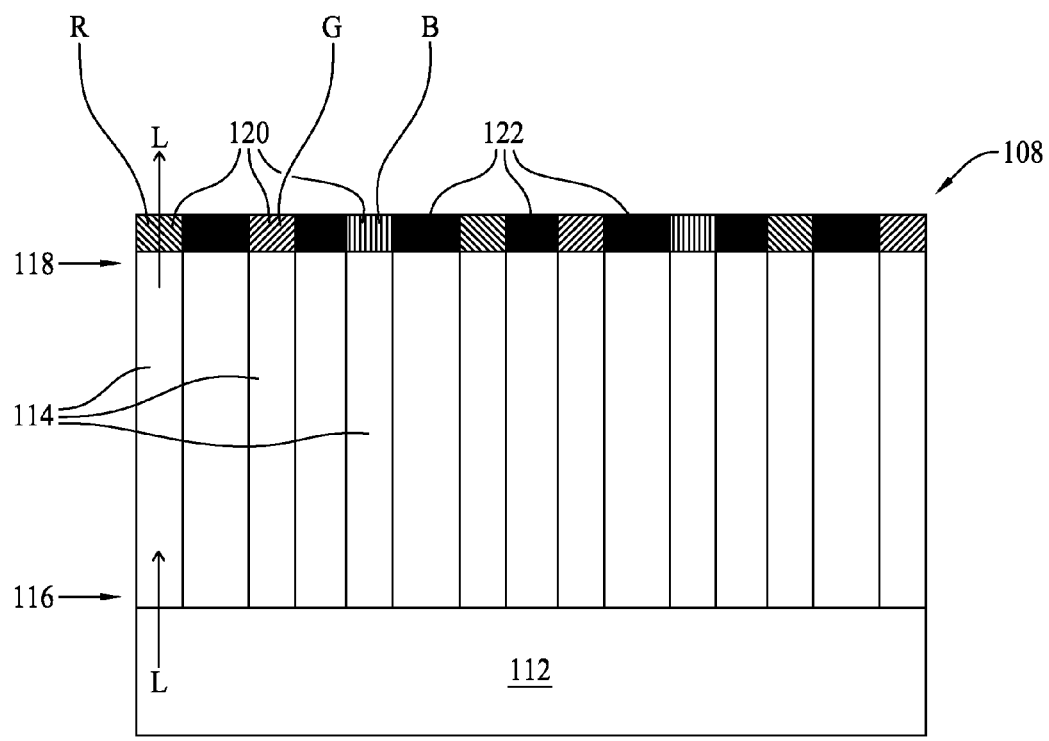
FIG. 4 is a schematic illustration of display system showing all micropillars in a nonactivated state.
Figure 5:
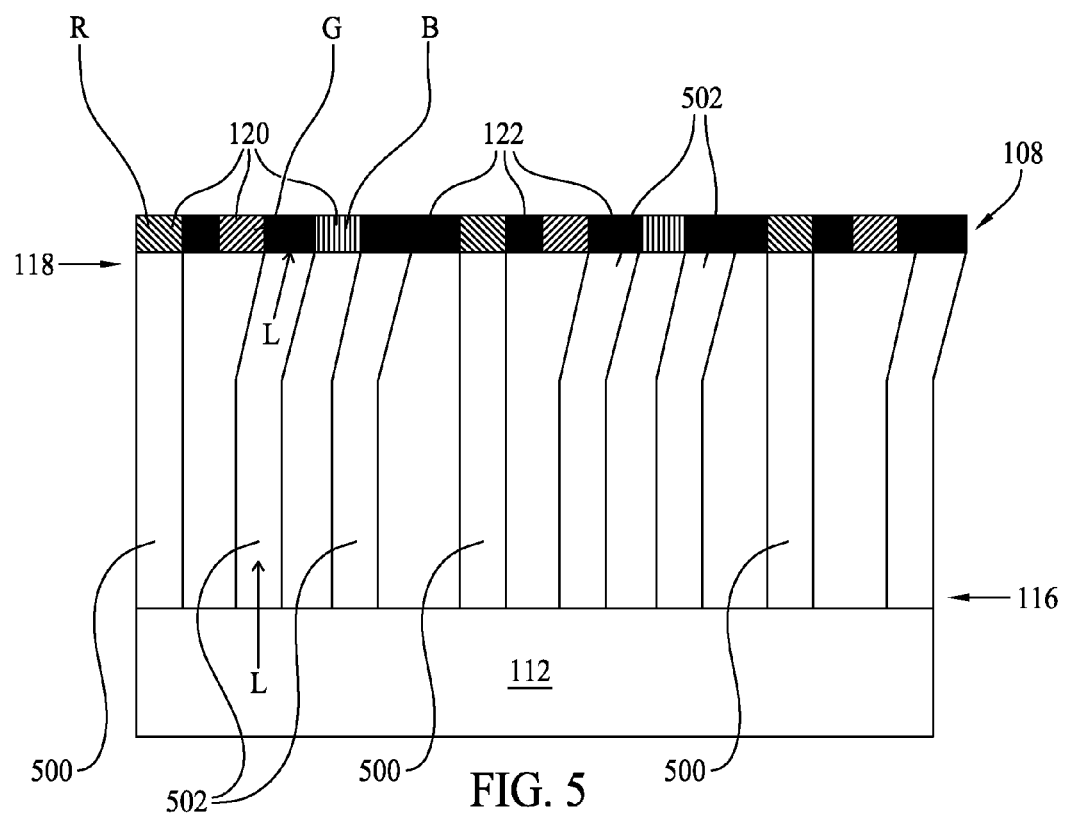
FIG. 5 is a schematic illustration of the display system shown in FIG. 5 having some activated micropillars.

Reference is now made to FIGS. 4 and 5. In the implementation illustrated in FIG. 4, each of the semi-transparent areas 120 may be a different color. For example, in one implementation the semi-transparent areas 120 alternate as red areas R, green areas G and blue areas B. However, any colors may be used that allow the system to function as described herein, such as Cyan, Magenta, Yellow and Black, or the like. As such, the system 100 may function as a full color display system. In FIG. 4, each of the micropillars 114 are illustrated in the deactivated state (state 200 shown in FIG. 2). As such, light L enters the fixed end 116 of the micropillars 114 and exits through all of the semi-transparent areas 120, thus making the display appear "white." However, in the exemplary implementation illustrated in FIG. 5, the system 100 has been activated such that only red light is transmitted from the filter layer 108. For example, in this implementation, the micropillars 500 remain in the deactivated state 200, such that light is transmitted through red areas R. However, micropillars 502 are shown in the fully activated state 230, such that light L is blocked by substantially opaque areas 122 after exiting free ends 118. As such, the only light exiting the filter layer 108 is red light. It will be appreciated that the micropillars 114 may be activated in any manner so as to display other colors of light. In some embodiments, the micropillars may be controlled (i.e., by way of controller 110) to sequentially activate and deactivate so as to create alternating colors, for example for moving picture displays, such as televisions, computers, or the like.

Figure 6:
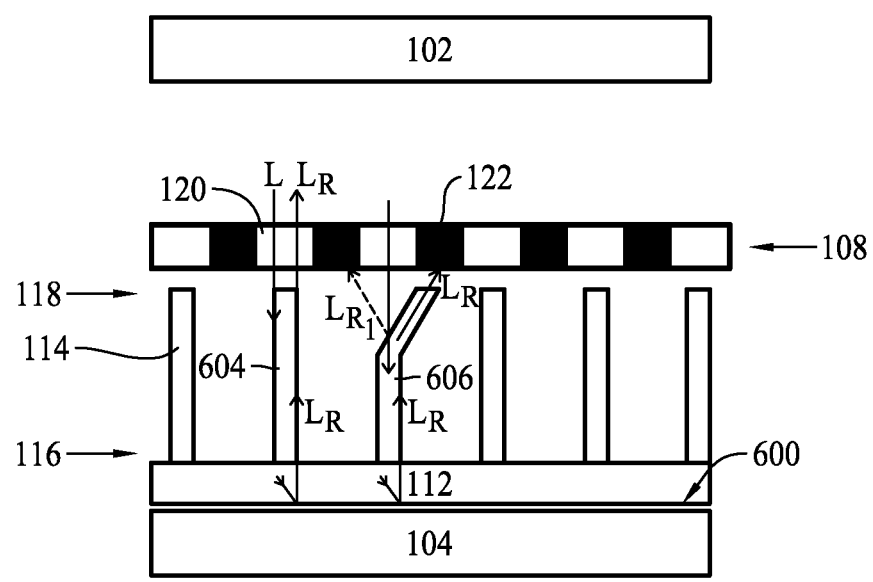
FIG. 6 is a schematic illustration of another implementation of a display system.

In another implementation, as illustrated in FIG. 6, the system 100 is configured such that the light source 102 is located above the filter layer 108. In this implementation, a reflective layer 600 is located between the activation layer 104 and the fixed ends 116 of the micropillars 114. In one exemplary implementation, the light source 102 is ambient light. In this implementation, the light source 102 emits light toward the filter layer 108, and then toward the micropillars 114. In this implementation, when the micropillars 114 are in the deactivated state, such as micropillar 604, light L enters the free end of the micropillar 604, travels through the micropillar 604 and then reflects off of the reflective surface 600. The reflected light $L_R$ travels back through the micropillar 604 and is emitted through the semi-transparent area 120, thus creating a "light spot" (i.e., a light pixel). However, to modulate the light, a micropillar 114, such as micropillar 606 is activated as discussed above. The micropillar 606 is thus activated such that its free end 118 is not aligned with the semi-transparent area 120. In the implementation shown, the free end 18 of micropillar 606 is aligned with the substantially opaque area 122. As such, light L transmitted through the semi-transparent area 120 strikes the side of the micropillar 606, and may be reflected away as light $L_{R1}$. The light $L_{R1}$ thus does not get reflected and exit back through the semi-transparent area 120. Any light L that may enter the micropillar 606 through the side thereof, will be reflected from reflective surface 600 and transmitted back through the micropillar 606 as light $L_R$. However, because micropillar 606 has a free end that is aligned with the substantially opaque area 122, the light $L_R$ is blocked by the substantially opaque area 122, thus creating a "dark spot" (i.e., a dark pixel). As such, by selectively activating the micropillars 114, a plurality of light and dark pixels can be created, to display an image. In some embodiments, sequential activation of the micropillars 114 can be used to create changing images, as discussed above.

In some embodiments, one or more of the components of the display system 100, such as the light source 102, activation layer 104, light modulation layer 106 and filter layer 108 are configured to be flexible such that the display system may be flexed, or bent and may be resiliently deformable such that after being bent to a deformed state, the display system 100 will return to a previously undeformed state.

As used herein, the term controller may refer to an electronic controller, which may include a computer processor or processing device (not shown). The processor is generally any piece of hardware that is capable of processing information such as, for example, data, computer-readable program code, instructions or the like (generally "computer programs," e.g., software, firmware, etc.), and/or other suitable electronic information. For example, the processor may be configured to execute computer programs or commands, which may be stored onboard the processor or otherwise stored in an associated memory (not shown). In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. As used herein, electronic or computer memory is generally any piece of hardware that is capable of storing information such as data, computer programs and/or other suitable information either on a temporary basis or a permanent basis. In one example, the memory may be configured to store various information in one or more databases. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk read-only-memory (CD-ROM), compact disk read/write memory (CD-R/W), digital video disk memory (DVD), or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable media, as described herein, may generally refer to a computer-readable storage medium or computer-readable transmission medium.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A display device comprising:
a light source for supplying light energy;
a light modulation layer including a plurality of micropillars each having a fixed end and a free end;
an activation layer configured to activate the micropillars such that light energy from the light source passing through the micropillars is modulated, and such that the light energy is emitted from the free end of the micropillars in different directions based on an activation state of the micropillars.

2. The display device according to claim 1, wherein the activation layer is configured to activate the micropillars by providing a voltage to the micropillars.

3. The display device according to claim 1 further comprising a filter layer including a plurality of opaque areas and a plurality of substantially transparent areas, wherein the light modulation layer is disposed between the filter layer and the activation layer.

4. The display device according to claim 3, wherein at least some of the substantially transparent areas are colored.

5. The display device according to claim 4, wherein the substantially transparent areas include at least one green area, at least one red area, and at least one blue area.

6. The display device according to claim 3, wherein each of the micropillars have a neutral position in which the free end is aligned with one of the substantially transparent areas and a bent position in which the free end is aligned with one of the opaque areas to modulate the light energy.

7. The display device according to claim 1, wherein the activation layer comprises a thin film transistor.

8. The display device according to claim 1, wherein the activation layer is located downstream of the light source, the light modulation layer is located downstream of the activation layer, and the filter layer is located downstream of the light modulation layer.

9. The display device according to claim 1, wherein the micropillars are configured to bend when activated.

10. An electronic display system, comprising:
a light source for supplying light energy;
a light modulation layer including a plurality of micropillars each having a fixed end and a free end, each micropillar corresponding to a pixel of an array of pixels;
an activation layer configured to activate the micropillars such that light energy from the light source passing through the micropillars is modulated, and such that the light energy is emitted from the free end of the micropillars in different directions based on an activation state of the micropillars, and
a controller in communication with the activation layer, the controller configured to selectively activate each of the micropillars individually.

11. The display system according to claim 10, further comprising a color filter layer, the color filter layer including an array of semi-transparent colored areas and substantially opaque areas, at least one semi-transparent colored area and at least one substantially opaque area associated with each of the micropillars.

12. The display system according to claim 11, further comprising a reflective layer between the micropillars and the activation layer.

13. The display system according to claim 11, wherein each of the micropillars is associated with at least three different colored semi-transparent colored areas.

14. The display system according to claim 10, wherein the free end of the micropillars is configured to bend upon activation by the activation layer.

15. A method of modulating a light source, comprising:
transmitting light from the light source through a light modulation layer including a plurality of micropillars each having a fixed end and a free end;
receiving the transmitted light at the fixed ends of the micropillars and emitting the light from the free ends of the micropillars; and
activating at least one of the micropillars to cause a free end of the activated micropillar to be out of alignment with the fixed end of the activated micropillar to modulate the light emitted from the activated micropillar to generate an image on a display.

16. The method according to claim 15, wherein activating at least micropillar causes the free end of the activated micropillar to be aligned with a substantially opaque area of a filter layer located downstream of the micropillars.

17. The method according to claim 16, further comprising transmitting light from the free ends of non-activated ones of the micropillars to a substantially transparent area of the filter layer.

18. The method according to claim 16, wherein activating the micropillars includes using a thin film transistor to activate the micropillars.

19. The method according to claim 17, further comprising transmitting light from the free ends of non-activated ones of the micropillars to at least one colored substantially transparent area of the filter layer.

20. The method according to claim 16 further comprising sequentially activating and deactivating a plurality of the micropillars to generate a moving image.

* * * * *